Aug. 11, 1964  R. J. HOYLE, JR., ETAL  3,143,878
STIFFNESS TESTER FOR LUMBER

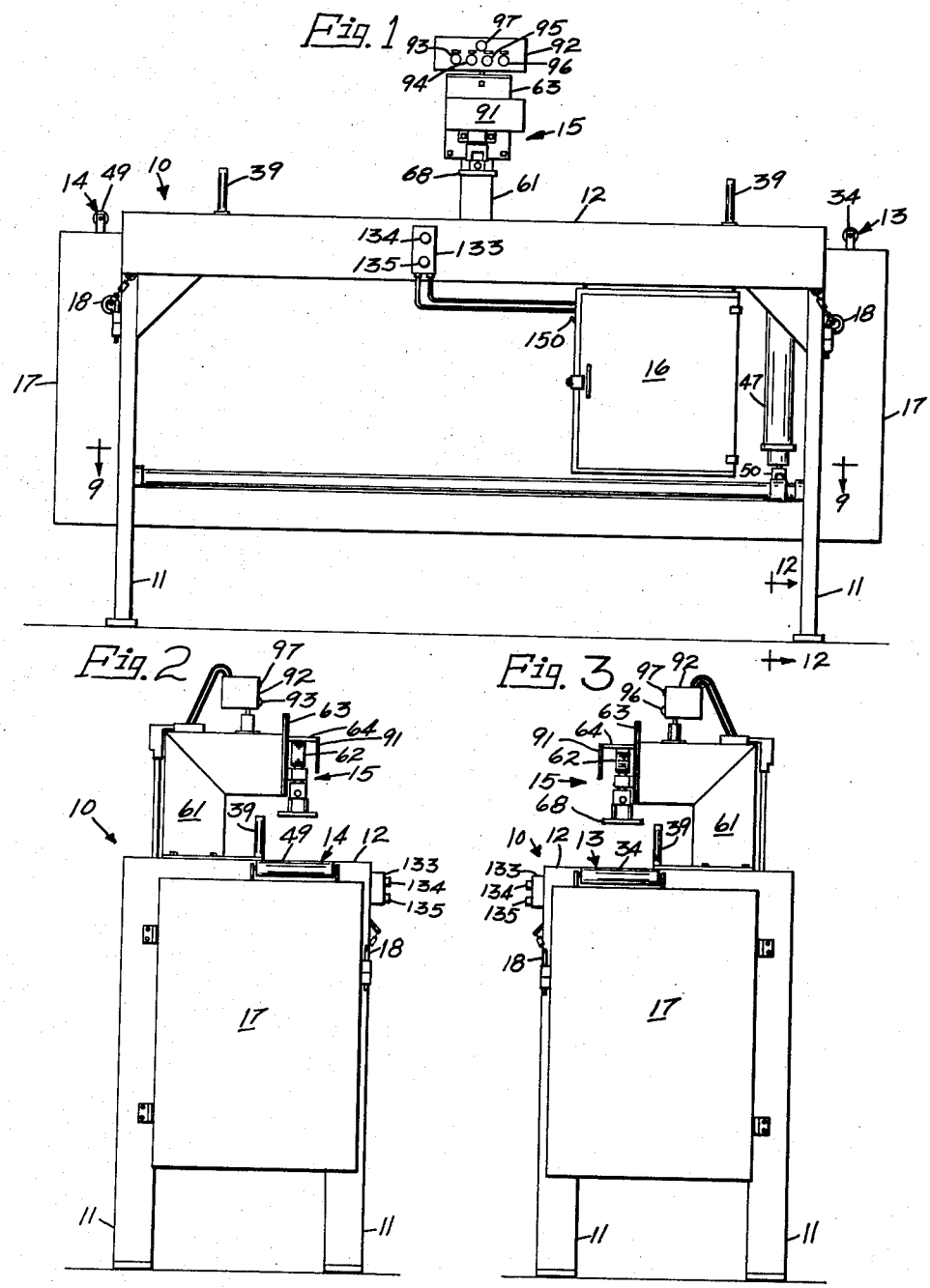

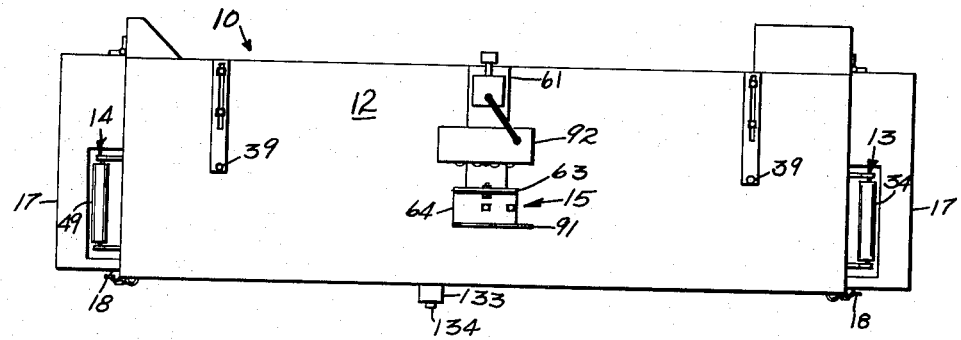
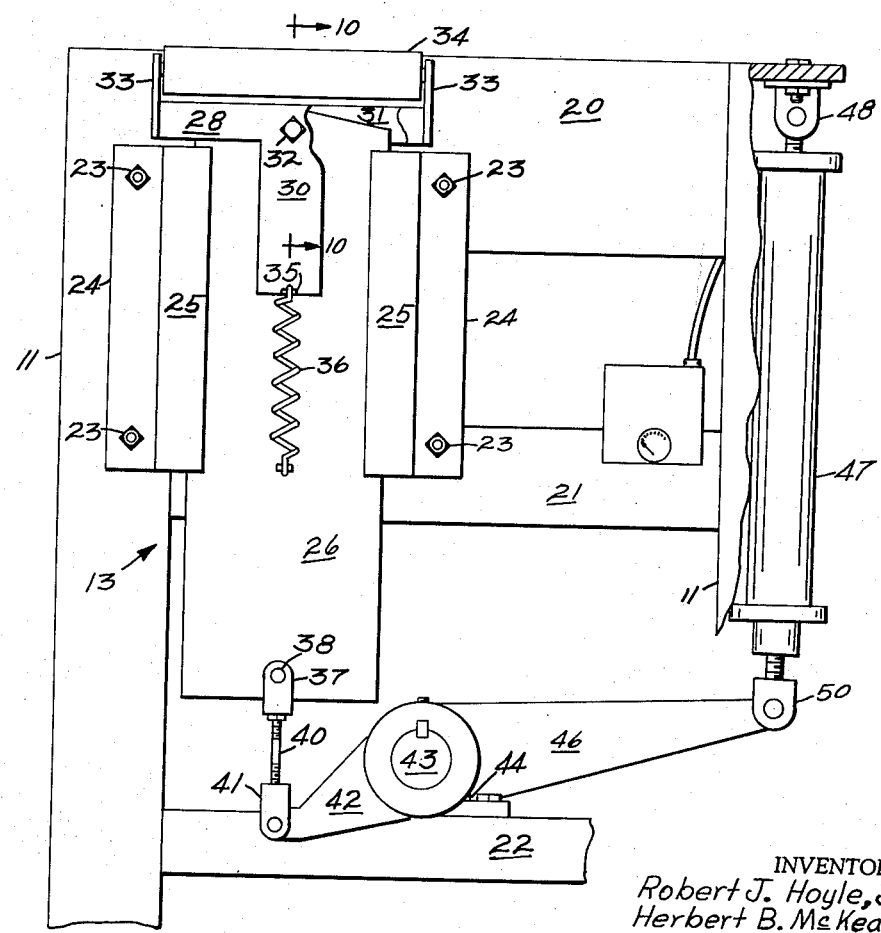

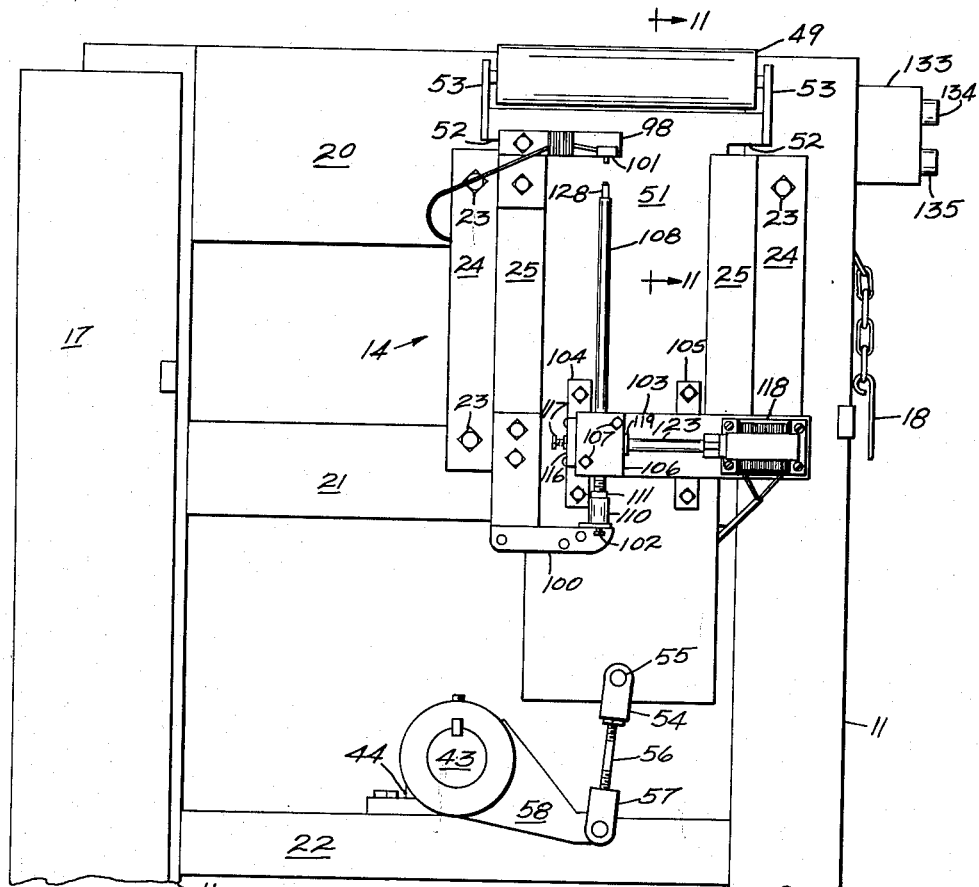
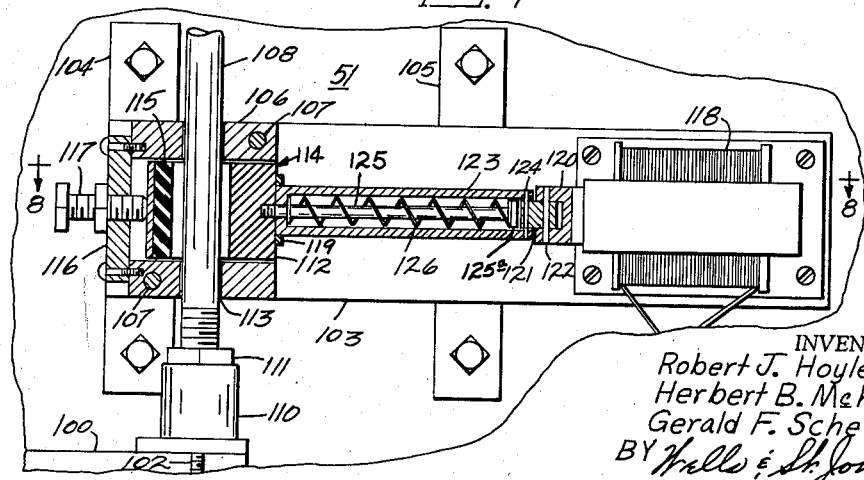

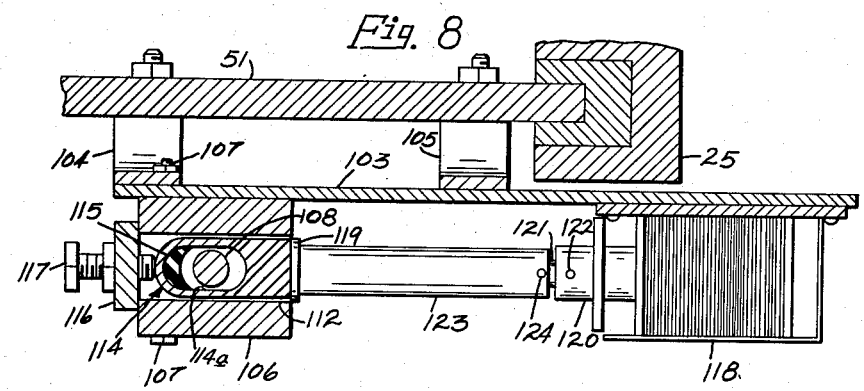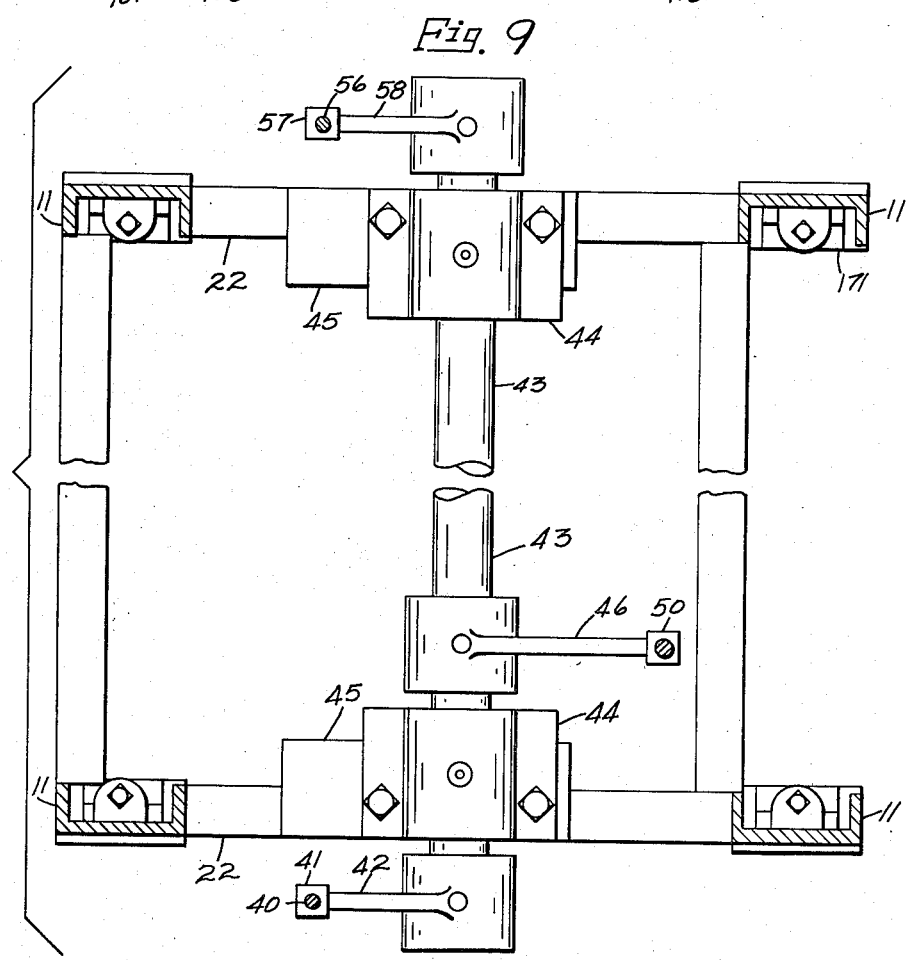

Filed Sept. 16, 1960  8 Sheets-Sheet 5

INVENTORS.
Robert J. Hoyle, Jr.
Herbert B. McKean
Gerald F. Scheelke
BY Wells & St. John
Attys.

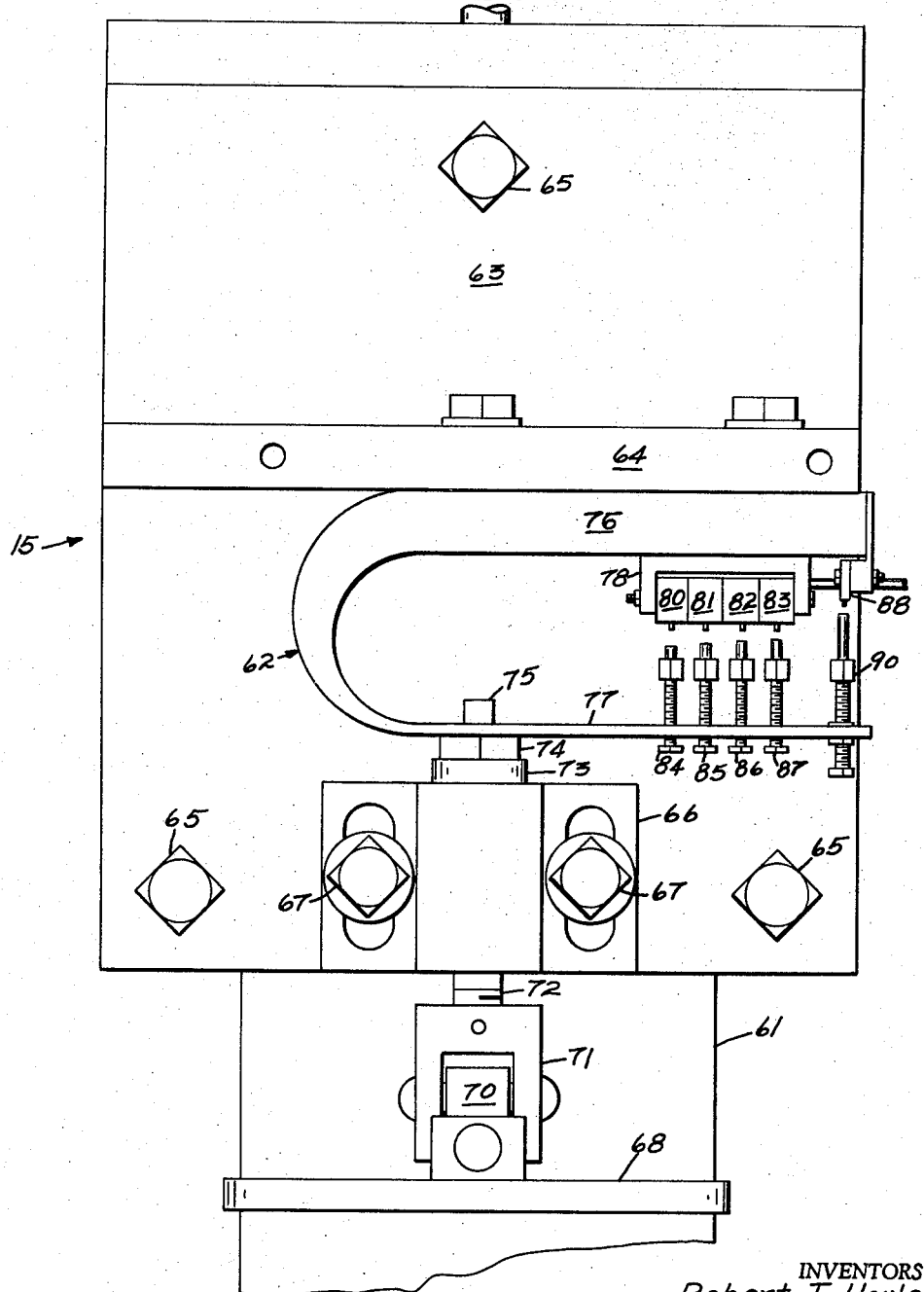

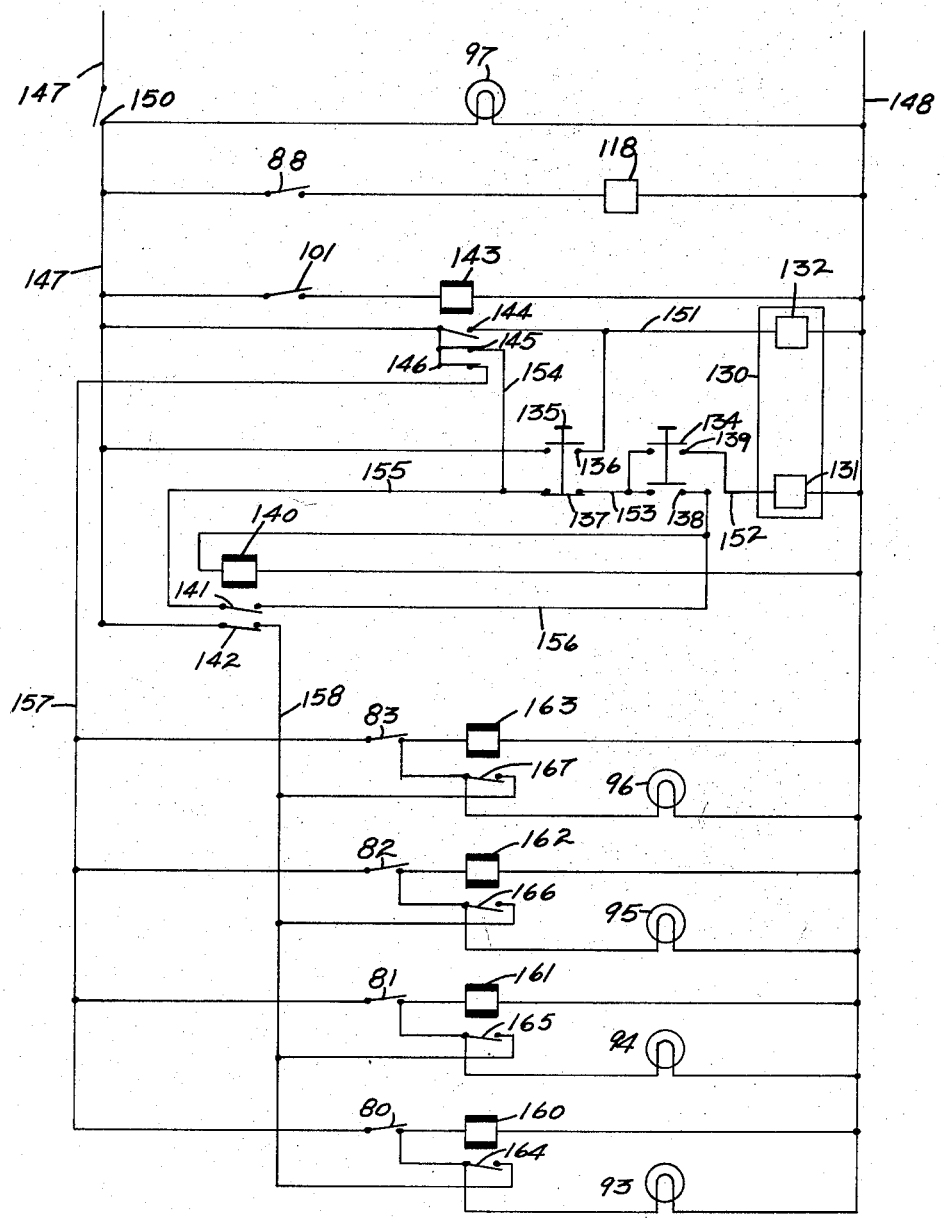

Aug. 11, 1964    R. J. HOYLE, JR., ETAL    3,143,878
STIFFNESS TESTER FOR LUMBER
Filed Sept. 16, 1960    8 Sheets—Sheet 8
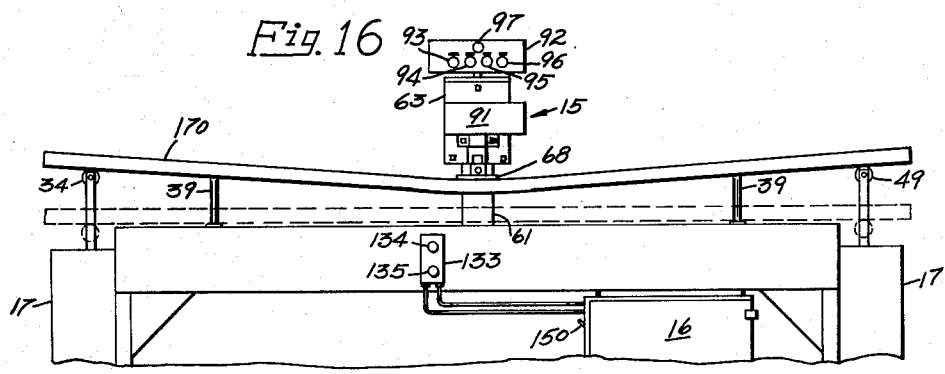
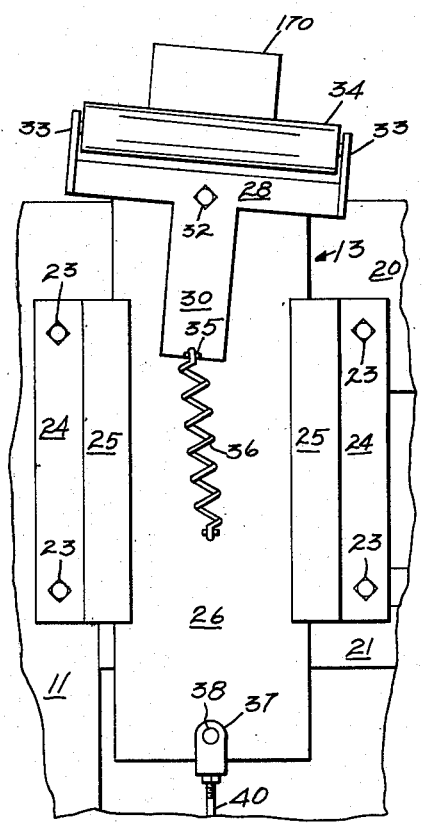
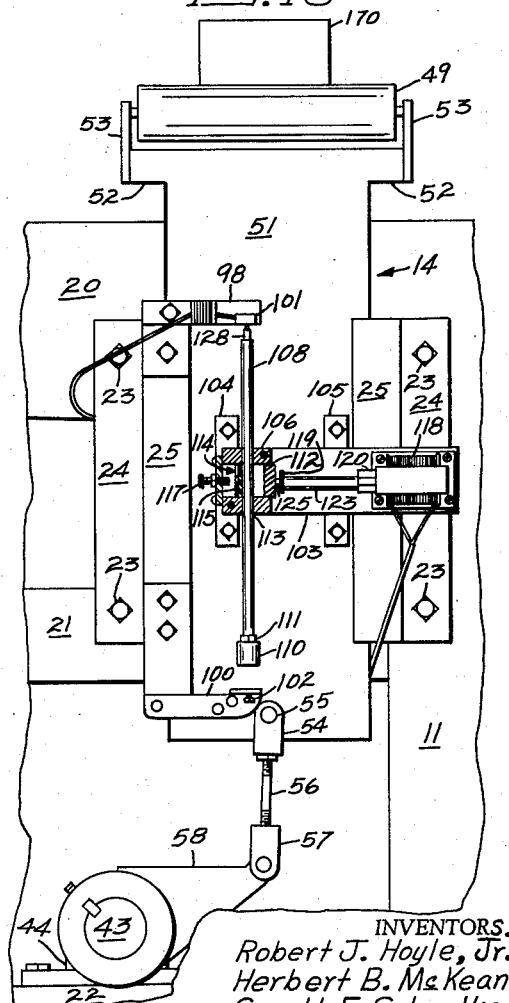
INVENTORS.
Robert J. Hoyle, Jr.
Herbert B. McKean
Gerald F. Scheelke
BY Wells & St. John
Attys.

United States Patent Office 3,143,878
Patented Aug. 11, 1964

3,143,878
STIFFNESS TESTER FOR LUMBER
Robert J. Hoyle, Jr., and Herbert B. McKean, Lewiston, Idaho, and Gerald F. Scheelke, Clarkston, Wash., assignors to Potlatch Forests Inc., Lewistown, Idaho, a corporation of Delaware
Filed Sept. 16, 1960, Ser. No. 56,388
11 Claims. (Cl. 73—100)

This invention relates to a stiffness tester for lumber adapted for rapid use as a commercial grading indicator. The machine is designed to give a rapid determination of the stiffness of a tested piece of lumber by using a nondestructive testing process.

It is an object of this invention to provide a machine capable of installation on a production line to test the longitudinal stiffness of lumber produced on the line so as to enable graders to accurately judge the worth of each piece of lumber produced. The machine is to be used as a visual indicating apparatus, but can also be used to control an automatic marking device to stamp the lumber.

It is an object of the invention to provide a simple mechanical testing apparatus controlled by an electrical circuit for producing a rapid testing sequence upon activation of a single switch. The invention is designed to enable one to adapt it to continuous automatic testing procedures where desired.

These and further objects will be evident from the following description of an exemplary practical embodiment of the invention. It is stressed that the machine shown in the accompanying drawings is merely illustrative and is not intended to limit the scope of the claimed invention.

In the drawings:

FIGURE 1 is a front view of the fully assembled testing apparatus;

FIGURE 2 is a left hand end view taken from FIGURE 1;

FIGURE 3 is a right hand end view taken from FIGURE 1;

FIGURE 4 is a top view of the apparatus in FIGURE 1;

FIGURE 5 is a view taken from the right hand end of FIGURE 1 on a larger scale with the shield opened and portions of the elements broken away;

FIGURE 6 is a view similar to FIGURE 5 showing the elements located at the left hand end of FIGURE 1;

FIGURE 7 is an enlarged vertical sectional view of the clutch apparatus;

FIGURE 8 is a sectional view of the clutch apparatus taken substantially along line 8—8 in FIGURE 7;

FIGURE 9 is a sectional view taken along line 9—9 in FIGURE 1 showing the control rod mechanism;

FIGURE 14 is an enlarged front view of the dynomometer assembly with the cover removed;

FIGURE 15 is a wiring diagram of the circuitry used to control the apparatus;

FIGURE 16 is a fragmentary front view of the apparatus in use;

FIGURE 17 is a fragmentary view looking at the right hand end assembly in FIGURE 16; and FIGURE 18 is a fragmentary view looking at the left hand end assembly in FIGURE 16.

Figure 10:
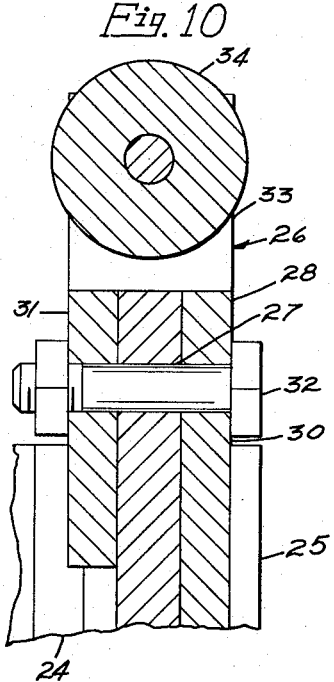
FIGURE 10 is an enlarged sectional view taken along line 10—10 in FIGURE 5.

Referring now to the drawings, the general arrangement of the tester is best seen in FIGURES 1 to 4. A rigid stationary frame 10 has four legs 11 supporting a horizontal table 12. Each end of frame 10 is provided with an anvil assembly generally designated as 13 and 14 respectively. In addition, a force sensing and measuring device 15 is centrally mounted intermediate the anvil assemblies 13, 14 and in opposition to the assemblies 13, 14. A control box 16 on frame 10 contains the wiring and electrical units used to program and control the operations of the machine.

The object of this machine is to test an individual piece of lumber to determine its stiffness. This factor is proportional to the force required to attain a given amount of deflection. In this machine, the deflection of a board set on anvil assemblies 13, 14 is constant with respect to the force sensing and measuring device 15 against which the board is deflected. Therefore, the force registered by the device 15 can serve as a practical indication of the board's stiffness. In the instant machine the forces are indicated by lighted lamps and can be used by a grader in determining the quality of the lumber. If desired, the force indication could be used to control an automatic stamping apparatus for continuous grading.

Each end of frame 10 has a cover or shield 17 hinged thereto about a vertical axis. The shields 17 are merely protective features and are locked in place by a pin 18. The shields 17 cover the ends of frame 10 and protect the anvil assemblies 13, 14 from damage due to accidental collision by outside objects.

The anvil assembly 13, seen in FIGURE 3 with shield 17 closed and in FIGURE 5 with shield 17 open, is mounted on frame 10 by means of a top plate 20, an intermediate plate 21 and a lower plate 22, all of which are rigidly joined to legs 11 in vertical alignment. An anvil guide is secured to the plates 20, 21 by means of bolts 23 which extend through the guide backing plate 24 which is rectangular in shape. Attached to the outside surface of plate 24 are two channels 25 in vertical parallel positions, the channel openings facing toward one another. Channelled bearing inserts can be used in channels 25 to improve the wearability of the anvil guides.

The anvil is designated as 26 and is generally rectangular in shape with the exception of a shallow triangular configuration at its upper end. The side edges of anvil 26 are slidably gripped by the two channels 25 to thereby restrict motion of anvil 26 to a vertical direction. Directly below the apex of its top triangular configuration, anvil 26 is provided with an aperture 27. A roller bracket 28, having a T-shaped outline, is placed on anvil 26 with a front leg 30 adjacent the outer surface of anvil 26 and a shorter back leg 31 adjacent its inner surface. The bracket 28 is pivoted to anvil 26 by means of a bolt 32 which extends through the aperture 27. The outer ends of the bracket 28 have widened upright posts 33 secured to them in vertical position. Rotatably mounted between the posts 33 is a roller 34 which is formed of metal or other suitable hard material.

In order to stabilize roller 34 in a horizontal position a bracket 35 is formed at the lower end of the front leg 30. A tension spring 36 is secured between bracket 35 and a similar bracket 36 formed on the outer surface of anvil 26 directly below aperture 27. The spring 36 biases bracket 28 to the position shown in FIGURE 5. However, when subjected to torsional forces, bracket 28 can pivot about bolt 32 in the manner later described with regard to FIGURE 17.

The lower end of anvil 26 has a toggle clevis 37 pivotally joined to it by means of a pin 38. The clevis 37 threadably receives a toggle rod 40 which is also threadably received in a second clevis 41. The threads at each end of rod 40 are opposite in form, enabling one to adjust the distance between the clevis 41 and the clevis 37 by rotation of rod 40.

The lower clevis 41 is pivotally joined to a short toggle arm 42 which is keyed to a toggle shaft 43. See FIGURE 9. Shaft 43 extends along the length of frame 10 and is journalled in two bearings 44 mounted on the upper surfaces of plate 22 on bearing pads 45.

The shaft 43 is rotated through a long toggle arm 46 also keyed to shaft 43. A double-acting pneumatic cylinder 47 is pivotally mounted between the table 12 and the outer end of toggle arm 46 by means of a first clevis 48 mounted between the cylinder 47 and table 12 and a second clevis 50 mounted between the opposite end of cylinder 47 and toggle arm 46. Thus it can be seen that rotation of shaft 43 can be mechanically accomplished by actuation of cylinder 47, and that rotation of shaft 43 will cause rectilinear motion of anvil 26 in a vertical direction.

Anvil assembly 14 is generally formed with identical structure to that already described with regard to assembly 13. This structure includes the three plates 20, 21 and 22 rigidly secured to legs 11 and the anvil guide having a backing plate 24 and channels 25 secured to the plates 20, 21 by bolts 23. The anvil itself is designated as 51 and is rectangular in shape with a pair of protruding portions 52 formed at its upper end. Two widened upright posts 53 are secured to the outer edges of portions 52 and serve to rotatably journal a roller 49 similar to the previously described roller 34. Roller 49 is therefore locked in a horizontal position, but moves vertically with anvil 51. The lower end of anvil 51 has a toggle clevis 54 pivotally joined to it by a pin 55. A toggle rod 56 is threadably engaged by clevis 54 and by a second clevis 57 which is pivoted to a short toggle arm 58 keyed to shaft 43. The operation of toggle arm 58 to vertically move anvil 51 is identical to that previously described with regard to anvil 26 and will occur simultaneously when cylinder 47 is actuated. Thus a board placed on rollers 34, 49 can be selectively elevated at each end by means of cylinder 47. A pair of adjustable vertical guide rods 39 are fixed to table 12 to position boards for testing.

At the center of the apparatus and mounted above table 12 in opposition to rollers 34, 49 is the fixed force sensing apparatus 15. This apparatus 15 is rigidly mounted on a standard 61 secured to table 12. The standard 61 extends above the table 12 and over the table into alignment with the two rollers 34, 49. The sensing apparatus utilizes a commercially available dynamometer 62 which is adapted to the instant device, but retains its originally-planned nature.

The dynamometer 62 is mounted on a frame 63 having a horizontal ledge 64 and bolted to standard 61 by bolts 65. (See FIGURE 14). A slide bearing 66 is adjustably mounted on frame 63 by two bolts 67. A pressure foot 68 is suspended by means of a pivot block 70 and a clevis 71 which cooperate to form a universal joint. The clevis 71 is threadably engaged by a push rod 72 that slidably fits within bearing 66. The upper end of the push rod 72 is provided with a collar 73 and a lock nut 74 and terminates in a reduced diameter portion 75 that protrudes through an aperture in the lower leg of dynomometer 62.

Dynamometer 62 is formed in a horseshoe shape having integral top and bottom legs 76, 77. The top leg 76 is fixed to ledge 64 and cannot move. The bottom leg 77 is movable by a force exerted upon it through push rod 72. A force exerted upwardly on leg 77 will result in a corresponding amount of flexure in leg 77.

The dynamometer 62 is provided with a block 78 of four microswitches 80–83. The switches 80–83 are adapted to be actuated by screws 84–87 respectively which are threadably engaged through apertures in leg 77. The screws 84–87 can be adjusted with respect to the switches 80–83 so as to be closed individually in a pre-set pattern dependent upon the force exerted upwardly by the push rod 72. Due to the shape of dynamometer 62, switch 83 will close first, followed in succession by switches 82, 81 and 80 in that order.

A fifth switch 88 is fixed to the upper leg 76 near its outer end. A long screw 90 is threadably engaged through leg 77 and is adapted to actuate switch 88. Switch 88 is placed on dynamometer 62 so as to be actuated by a minimum upward pressure being exerted through the push rod 72. The front area of dynamometer 62 is protected from external damage by a vertical plate 91 attached to ledge 64. Mounted on standard 61 is a light panel 92 of conventional box construction to enclose the wiring. The front surface of the panel 92 is provided with a row of four lamps 93–96 and a pilot lamp 97, whose functions will be explained below.

Mounted on anvil assembly 14 is a deflection measuring assembly. It can best be seen in FIGURES 6–8 and 18. A pair of spaced abutments 98 and 100 are secured to the left hand channel 25 in vertical alignment. The upper abutment 98 has a micro-switch 101 secured to its outer end. The lower abutment 100 is provided with an adjustable vertical screw 102 which projects through a horizontal ledge to form a vertically adjustable stop. A mounting plate 103 is spaced outwardly from anvil 51 by means of two bent straps 104, 105 which are secured to the outside surface of anvil 51. A steel block 106 is fixed to the plate 103 by bolts 107. Block 106 is provided with a vertical aperture 113 through its height and in vertical alignment with the stop screw 102 and the actuating element of switch 101. A striker rod 108 is slidably received through this aperture 113. The lower end of bar 108 is threaded and is terminated by a correspondingly threaded cap 110 and a lock nut 111 used to vary the effective length of the striker bar 108.

The block 106 is also provided with a horizontal rectangular aperture 112 which intersects the vertical aperture 113. Slidably mounted within aperture 112 is a slidable piston 114 having an oval vertical aperture 114a which has a rubber lining 115 on one of its curved inner surfaces and surrounds the striker bar 108. As seen in FIGURE 7, the left hand end of block 106 is closed by a plate 116 which has a stop screw 117 threadably mounted through it for abutment with the piston 114.

The piston 114 serves as a clutch to secure the striker rod 108 against vertical motion with respect to block 106 when rod 108 is engaged by lining 115. In order to effect this engagement, a clamp solenoid 118 is mounted on plate 103. The actuating element 120 of solenoid 118 is pivotally connected to an intermediate bar 121 by means of a pin 122. Bar 121 in turn is received within a hollow spring housing 123 and is secured to housing 123 by a pin 124. Slidably mounted within housing 123 is a rod 125 having an enlarged end 125a. The end of housing 123 adjacent to piston 114 is closed and abuts a washer 119. Mounted between this closed end and the enlarged end of rod 125 is a compression spring 126. As seen from FIGURE 7, actuation of solenoid 118 will pull rod 125 to the right through the action of spring 126. Release of solenoid 118 will cause the spring 126 to release and bar 121 and rod 125 will again assume the positions shown in this figure. Movement of piston 114 to the left is adjustably limited by screw 117.

As a protective feature, the upper end of striker bar 108 is hollow and encloses a small compression spring 127 which abuts a slidable tip 128. Should bar 108 be forced upwardly against the switch 101, spring 127 can yield to protect the switch 101 from damage due to excess pressure.

The wiring circuits used to control the operation of the apparatus are shown in FIGURE 15. Cylinder 47 is controlled by a suitable four way valve indicated generally by the numeral 130. Valve 130 has an "up" solenoid 131 which opens a fluid circuit to expand the length of cylinder 47, and a "down" solenoid 132 which opens a fluid circuit to contract the length of cylinder 47. A box 133 on the front of frame 10 contains a "start" switch 134 and a "stop" switch 135. Both switches 134 and 135 are single acting switches having two sets of poles. The upper poles 136 in switch 135 are normally open, while the lower poles 137 are normally closed. Both sets of poles 138 and 139 in switch 134 are normally open. The circuits also include a time delay relay 140 having two sets of contact points 141, 142. Points 141 are untimed and remain closed so long as the relay 140 is actuated. Points 142 are timed and remain closed for a set duration after circuit to relay 140 is opened. Another relay 143 is a reset relay and has a first pair of normally open points 144 and two sets of normally closed points 145, 146. The input lines 147 and 148 are suitably connected to a source of electrical energy. A main circuit breaker 150 is placed in line 147 for protective reasons. Wired across the lines 147, 148 is the pilot lamp 97 which will be lighted on panel 92 whenever the circuit breaker 150 is closed. Pilot lamp 97 serves as an indication that the apparatus is ready for use.

The micro-switch 88 and clamp solenoid 118 are wired in series across the lines 147, 148. When switch 88 is closed, the clamp solenoid 118 will be actuated and the clutch element 114 will grip the striker bar 108. Also wired in series across lines 147, 148 are the micro-switch 101 and the reset relay 143. When switch 101 is closed by engagement of striker bar 108, relay 143 will be actuated.

The "down" solenoid 132 in valve 130 is wired in series with the normally open points 144 in relay 143. As an override switch, the "down" switch 135 has its poles 136 wired between line 147 and the intermediate connection 151 between points 144 and solenoid 132. The "up" solenoid 131 in valve 130 is connected to poles 139 of the "up" switch 134 by a wire 52. The remaining pole 138 is connected by a wire 153 to one side of the normally closed poles 137 in the "down" switch 135. The second terminal of poles 137 is wired by a line 154 to normally closed points 145 in reset relay 143 which are connected to line 147. This second terminal is also connected by line 155 to a first side of the untimed points 141 of relay 140. The remaining side of points 141 is connected by a line 156 to the poles 138. The relay 140 is wired between line 156 and line 148.

The final normally closed points 146 in reset relay 143 are connected between line 147 and a line 157. The timed points 142 are connected between a line 158 and the line 147.

Each lamp circuit for the lamp 93-96 is identical. The controlling micro-switch 80-83 is wired in series with a holding relay 160-163 across lines 157, 148. The points 164-167 of relays 160-163 are wired between the intermediate connection of relay 160-163 and switch 80-83 and the line 158. Lamp 93-96 is wired between this intermediate connection and line 148.

As can be seen, the machine has provision for many adjustments so as to allow the testing procedure to be precise. The elevations of anvils 26 and 51 are independently adjustable by rotation of toggle rods 40 and 56 respectively. It is desirable that the two rollers 34, 49 be level with the top surface of table 12. The elevation of the pressure foot 68 above table 12 is adjustable by rotation of push rod 72. The position of guide rods 39 can be varied to accommodate different widths of lumber.

The amount of travel of the anvils 26, 51 after initial contact of a board by the pressure foot 68 is controlled solely by the striker rod 108. As seen in FIGURE 6, the amount of deflection at each end of the board is equal to the distance between the top end of tip 128 and the bottom of the actuating button for switch 101. This rest clearance can be varied to suit by adjustment of screw 102. The forces required to close the five switches 80-83 and 88 can be varied by adjustment of screws 84-87 and 90. The switch 88 should be set so as to be closed shortly after the test board touches the pressure foot 68. The four switches 80-83 should be set at convenient force intervals embracing the contemplated stiffness expected. The actual force settings will be dependent upon the spacing of anvils 26 and 51 and the thickness of the boards being tested.

Figure 12:
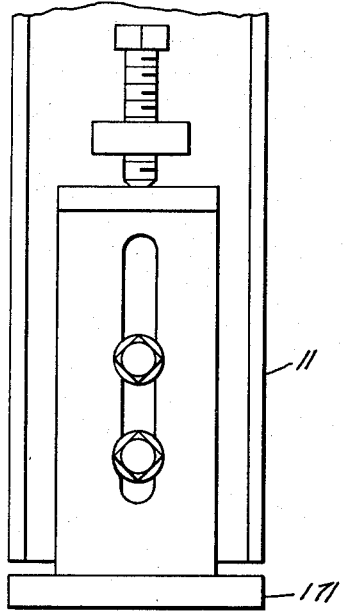
FIGURE 12 is an enlarged view of the leg adjusting assembly as viewed along line 12—12 in FIGURE 1.
Figure 11:
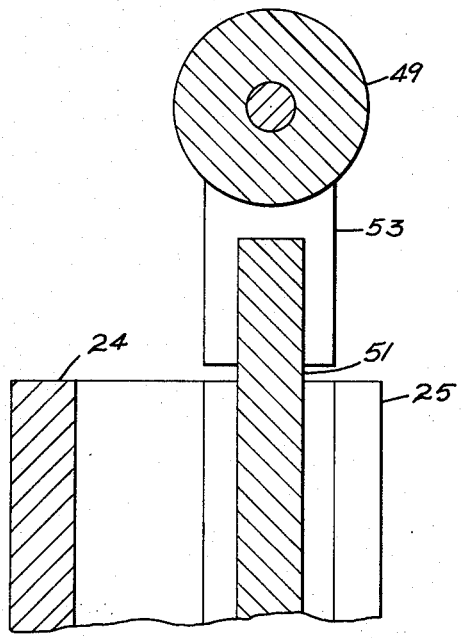
FIGURE 11 is an enlarged sectional view taken along line 11—11 in FIGURE 6.
Figure 13:
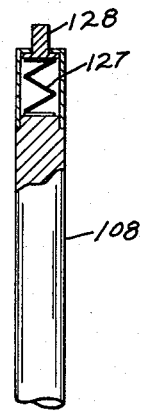
FIGURE 13 is an enlarged view of the actuating rod, with a portion of the rod shown in vertical section.

The machine is designed for rapid testing, the average duration being about two seconds per board. The board can be set transversely against guide rods 39 by hand or can be placed longitudinally on table 12 by a conveyor system. The anvil 26 is built to accommodate twist in the board and each anvil is provided with a transverse roller 34 or 49, so as to provide spaced vertical abutments and line contact with the board throughout vertical movement of anvils 26, 51. The clutch mechanism engaging the striker rod 108 is designed to allow for initial bow in the lumber. Each leg 11 has an adjustable foot 171, as shown in FIGURE 12, which is used to level table 12.

After a board 170 is placed on the rollers 34, 49, the operator pushes the "start" switch 134. The switch 134 closes a power circuit to the "up" solenoid 131 in valve 130 which provides air to cylinder 47 and pushes anvils 26, 51 in an upward vertical direction. This power circuit to solenoid 131 is initially completed through poles 139, poles 137 and points 145 in relay 143. Switch 134 completes a similar circuit to the relay 140, which closes points 141, 142. After the "start" switch 134 is released, relay 140 holds the valve 130 in "up" position by means of the untimed points 141.

The board 170 then rises on rollers 34 and 49 until its central area presses against pressure foot 68. Slight upward pressure on foot 68 will close the switch 88 on dynamometer 62. Switch 88 then actuates the solenoid 118 causing striker rod 108 to be gripped by the lining 115 of clutch element 114. Rod 108 then travels vertically with the anvil 51. As pressure is increased on pressure foot 68, the switches 83, 82, 81 and 80 will be closed successively, depending upon the stiffness of board 170.

When switch 83 closes it completes a power circuit to relay 163 and lamp 96 through switch 83, and points 146 in relay 143. Relay 163 closes points 167 to complete a holding circuit to light the panel lamp 96 through the timed points 142 in relay 140 and also to complete an alternate circuit for relay 163. As each switch 80-83 is closed, similar action will occur in each lamp circuit.

When striker rod 108 hits switch 101, the reset relay 143 is activated. Points 144 then close a circuit to the "down" solenoid 132 in valve 130 to exhaust cylinder 47. Simultaneously the points 145 open the power circuit to the "up" solenoid 131 and relay 140. The timed points 142 remain closed for a pre-set duration to hold the lighted lamps 93-96 actuated to enable the operator to take a reading. As the anvils 26, 51 proceed downward, switches 80-83 and 88 will be opened. After the timed period of points 142 expires they will open circuits to the lighted lamps 93-96. The machine is then set for another board.

Various modifications are possible without deviating from this invention. Therefore only the following claims are intended to define the limits of the invention.

Having thus described our invention, we claim:
1. A stiffness tester for lumber, comprising:
    a rigid supporting frame;
    deflection means mounted on said frame, said deflection means including spaced supports adapted to contact a first surface of a test length of lumber and intermediate means located between said supports and opposed thereto, the intermediate means being adapted to contact the surface of a test length of lumber opposite to said first surface;
    motion producing means mounted on said frame operatively connected to said deflection means adapted to effect relative motion of said supports and said intermediate means toward one another to thereby cause deflection of a test length of lumber contacted thereby;

force sensing means mounted on said frame operatively connected to said deflection means adapted to indicate the reactive force exerted by a test length of lumber due to its deflection;

and motion limiting means mounted on said frame and said deflection means operatively connected to said motion producing means and to said force sensing means adapted to limit the relative motion of said supports and said intermediate means to a pre-selected value beyond an initial amount of motion required to effect a pre-selected indication of reactive force by said force sensing means.

2. A stiffness tester as defined in claim 1, further comprising:

a control means mounted on said frame operatively connected to said motion limiting means and to said motion producing means adapted to automatically return said deflection means to its initial condition upon attainment of said pre-selected value of relative motion of said supports and said intermediate means.

3. A stiffness tester for lumber comprising:

a rigid supporting frame;

a pair of spaced supports mounted on said frame adapted to contact a first surface of a test length of lumber, one of said supports being movable relative to said frame in a direction perpendicular to the lumber surface contacted thereby;

force sensing means fixed to said frame intermediate said supports and opposed thereto, said force sensing means being adapted to contact the surface of a test length of lumber opposite to said first surface and to indicate the reactive force exerted thereon by the contacted length of lumber;

motion producing means mounted on said frame operatively connected to said one support adapted to selectively cause said one support to move relative to said frame in a direction opposed to said force sensing means and perpendicular to the surface contacted thereby;

and motion limiting means mounted on said frame and said one support operatively connected to said motion producing means and to said force sensing means adapted to limit the motion of said one support relative to the frame to a pre-selected value beyond an initial amount of motion required to effect a pre-selected indication of reactive force by said force sensing means.

4. A stiffness tester for lumber, comprising:

a rigid supporting frame;

a pair of spaced supports mounted on said frame adapted to contact a first surface of a test length of lumber, each of said supports being movable relative to said frame in a direction perpendicular to the lumber surface contacted thereby;

force sensing means fixed to said frame intermediate said supports and opposed thereto, said force sensing means being adapted to contact the surface of a test length of lumber opposite to said first surface and to indicate the reactive force exerted thereon by the contacted length of lumber;

motion producing means mounted on said frame operatively connected to said pair of supports adapted to selectively cause said supports to move in unison relative to said frame in a direction opposed to said force sensing means and perpendicular to the surface contacted thereby;

and motion limiting means mounted on said frame and on one of said supports operatively connected to said motion producing means and to said force sensing means adapted to limit the motion of said supports relative to the frame to a pre-selected value beyond an initial amount of motion required to effect a pre-selected indication of reactive force by said force sensing means.

5. A stiffness tester for lumber, comprising:

a rigid supporting frame;

first and second parallel support elements spaced from one another on said frame adapted to contact a first surface of a test length of lumber, each of said support elements being independently mounted on the frame for motion relative thereto in a direction perpendicular to the lumber surface contacted thereby;

a force sensing apparatus fixed to the frame intermediate said support elements and opposed thereto, said force sensing apparatus being adapted to contact the surface of a test length of lumber opposite to said first surface, said force sensing apparatus including a plurality of pairs of normally open electrical contacts which are successively closed as force is applied to the apparatus by a test piece of lumber contacted thereby;

indicator means connected in an electrical circuit including said pairs of contacts, said indicator means being adapted to produce an indication of the force exerted on said force sensing apparatus;

motion producing means mounted on said frame operatively connected to said support elements adapted to selectively cause said support elements to move in unison relative to said frame in a direction opposed to said force sensing apparatus and perpendicular to the surface contacted thereby;

and control means operatively connected to said motion producing means including means mounted on said frame and on one of said support elements operatively connected to said motion producing means and to said force sensing apparatus adapted to limit the motion of said support elements relative to the frame to a pre-selected value beyond an initial amount of motion required to cause a pre-selected force to be exerted on said force sensing apparatus by the tested length of lumber.

6. The stiffness tester as defined in claim 5 wherein said last-named means comprises:

a movable member mounted on said one support element for motion parallel thereto independently of said one support element;

means mounted on said frame and extending across the path of said movable member adapted to initially position said movable member relative to the frame;

electrically operated means mounted on said one support element and wired in series with one of said pairs of contacts, said electrically operated means being adapted when activated by closing of said one pair of contacts to engage the movable member and to fix the position of said movable member relative to said one support element;

fixed stop means mounted on said frame in the path of said movable member when engaged by said electrically operated means, said fixed stop means including electrical contacts wired to said control means and adapted to be operated by engagement with said movable member, said last-named contacts being adapted to prevent further motion of said motion producing means when operated by engagement with said movable member.

7. A stiffness tester for lumber, comprising:

a rigid supporting frame;

a pair of horizontal transverse supports spaced parallel to each other on said frame;

a pair of mounting brackets on said frame respectively carrying said supports for vertical movement relative to the frame;

a force sensing device mounted in a fixed position on said frame intermediate and above said supports in longitudinal alignment therewith, said pressure sensing device being positioned in opposition to said supports, and including a plurality of control elements adapted to be selectively actuated in response to the force exerted upon the device;

motion producing means mounted on said frame connected to said pair of supports adapted to selectively cause said supports to move in unison relative to said frame in opposition to said force sensing means;

and a motion limiting mechanism on one of said supports including a striker bar slidably mounted on the support about a vertical axis, a pair of abutments located on said frame at spaced positions vertically aligned with said striker bar above and below said striker bar, clutch means on said support adapted to lock said striker bar to support, said clutch means being operatively connected to a first one of said control elements.

8. The stiffness tester as defined in claim 7 further comprising:

pressure sensitive means mounted on the upper one of said abutments in the path of said striker bar so as to be engageable thereby, said pressure sensitive means being operatively connected to said motion producing means.

9. The stiffness tester as defined in claim 7 wherein each of said supports comprises:

an anvil slidably supported by said brackets;

and a roller rotatably mounted on the upper end of said anvil about a transverse axis;

one of said supports including a bracket for said roller, said bracket being pivotally connected to said anvil at its center, and biasing means connected between said anvil and the bracket adapted to maintain the roller axis in a horizontal position.

10. A stiffness tester for lumber, comprising:

a rigid supporting frame;

first and second mounting brackets fixed to said frame and longitudinally spaced from each other on said frame;

first and second anvils slidably mounted on said first and second mounting brackets respectively for vertical motion relative to the frame;

first and second transverse support rollers rotatably mounted on said first and second anvils respectively at the upper ends thereof;

a force sensing device fixed to said frame above said first and second transverse support rollers and intermediate thereto, said force sensing device including a horseshoe-type dynamometer having one leg fixed to said frame, the remaining leg being connected to a force transmitting element extending oppositely to said anvils, and a plurality of micro-switches and associated micro-switch activating elements mounted on said dynamometer, said micro-switches being adapted to be successively actuated responsive to upward force exerted upon said force transmitting element;

motion producing means operatively connected between said frame and said first and second anvils;

electrically operated control means connected to said motion producing means adapted to selectively effect upward or downward motion of said anvils relative to said frame;

motion limiting means on one of said anvils and on said frame operatively connected to a first one of said micro-switches and to said control means adapted to limit the motion of said anvils to a pre-selected value beyond the initial motion required to produce a reactive force through a tested board to said force transmitting element sufficient to actuate said first micro-switch;

and force indicating means including individual indicators connected to each of the remaining micro-switches to be respectively actuated thereby.

11. A stiffness tester as defined in claim 10 further comprising:

a pivotal carrier for one of said rollers, said carrier being pivotally carried at its center to the anvil associated therewith for pivotal motion about a longitudinal axis;

and vertical spring means connected between said carrier and said anvil as an extension of said carrier beyond its pivotal connection to said anvil, said spring means being adapted to bias the roller to a horizontal position.

References Cited in the file of this patent
UNITED STATES PATENTS

| | | |
|---|---|---|
| 2,032,989 | Kenney et al. | Mar. 3, 1936 |
| 2,312,755 | Dehn | Mar. 2, 1943 |
| 2,338,338 | Kieckhefer | Jan. 4, 1944 |
| 2,693,107 | Paden | Nov. 2, 1954 |
| 2,748,829 | Korenak | June 5, 1956 |
| 2,840,135 | Fowler | June 24, 1958 |
| 2,949,770 | Kernan et al. | Aug. 23, 1960 |

OTHER REFERENCES

Brochure "Force Control Switch," published by Dillon & Company, Inc., Van Nuys, Calif., Sept. 15, 1959.